United States Patent
Zheng et al.

(10) Patent No.: US 8,340,385 B2
(45) Date of Patent: Dec. 25, 2012

(54) METHOD AND SYSTEM FOR LEFT VENTRICLE DETECTION IN 2D MAGNETIC RESONANCE IMAGES USING RANKING BASED MULTI-DETECTOR AGGREGATION

(75) Inventors: Yefeng Zheng, Dayton, NJ (US); Bogdan Georgescu, Plainsboro, NJ (US); Arne Littmann, Erlangen (DE); Edgar Mueller, Heroldsbach (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 558 days.

(21) Appl. No.: 12/630,061

(22) Filed: Dec. 3, 2009

(65) Prior Publication Data

US 2010/0142787 A1    Jun. 10, 2010

Related U.S. Application Data

(60) Provisional application No. 61/120,143, filed on Dec. 5, 2008.

(51) Int. Cl.
*G06K 9/00* (2006.01)
(52) U.S. Cl. .................................................. 382/131
(58) Field of Classification Search ........... 382/128–133
See application file for complete search history.

(56) References Cited

U.S. PATENT DOCUMENTS

| | | | | |
|---|---|---|---|---|
| 5,617,459 A * | 4/1997 | Makram-Ebeid et al. | ...... | 378/62 |
| 5,889,524 A * | 3/1999 | Sheehan et al. | ...... | 345/419 |
| 6,961,454 B2 | 11/2005 | Jolly | | |
| 2003/0038802 A1 * | 2/2003 | Johnson et al. | ...... | 345/420 |
| 2005/0018890 A1 * | 1/2005 | McDonald et al. | ...... | 382/128 |
| 2006/0239554 A1 * | 10/2006 | Sun et al. | ...... | 382/173 |
| 2007/0236491 A1 * | 10/2007 | Hundley et al. | ...... | 345/418 |
| 2007/0270692 A1 * | 11/2007 | Barbu et al. | ...... | 600/431 |
| 2008/0085050 A1 * | 4/2008 | Barbu et al. | ...... | 382/154 |
| 2008/0101676 A1 | 5/2008 | Zheng et al. | | |
| 2008/0211812 A1 | 9/2008 | Barbu et al. | | |
| 2008/0260230 A1 * | 10/2008 | Gotardo et al. | ...... | 382/131 |
| 2008/0292169 A1 * | 11/2008 | Wang et al. | ...... | 382/131 |
| 2009/0080745 A1 | 3/2009 | Zheng et al. | | |
| 2009/0214090 A1 * | 8/2009 | Hayes | ...... | 382/128 |
| 2009/0290777 A1 * | 11/2009 | Sun et al. | ...... | 382/131 |

OTHER PUBLICATIONS

Y. Freund, et al., "An Efficient Boosting Algorithm for Combining Preferences", J. Machine Learning Research, 4 (6):933-969, 2003.

\* cited by examiner

*Primary Examiner* — Jingge Wu

(57) ABSTRACT

A method and system for left ventricle (LV) detection in 2D magnetic resonance imaging (MRI) images is disclosed. In order to detect the LV in a 2D MRI image, a plurality of LV candidates are detected, for example using marginal space learning (MSL) based detection. Candidates for distinctive anatomic landmarks associated with the LV are then detected in the 2D MRI image. In particular, apex candidates and base candidates are detected in the 2D MRI image. One of the LV candidates is selected as a final LV detection result by ranking the LV candidates based on the LV candidates, the apex candidates, and the base candidates using a trained ranking model.

24 Claims, 6 Drawing Sheets

FIG. 4

Given: Initial distribution $D$ over $\mathcal{X} \times \mathcal{X}$.

Initialize: $D_1 = D$.

For $t = 1, 2, \ldots, T$

- Train weak learner using distribution $D_t$ to get weak ranking $h_t : \mathcal{X} \to \mathbb{R}$.
- Choose optimal $\alpha_t \in \mathbb{R}$.
- Update:
$$D_{t+1}(x_0, x_1) = \frac{D_t(x_0, x_1) \exp[\alpha_t(h_t(x_0) - h_t(x_1))]}{Z_t}$$
where $Z_t$ is a normalization factor (chosen so that $D_{t+1}$ will be a distribution).

Output the final ranking: $H(x) = \sum_{t=1}^{T} \alpha_t h_t(x)$.

METHOD AND SYSTEM FOR LEFT VENTRICLE DETECTION IN 2D MAGNETIC RESONANCE IMAGES USING RANKING BASED MULTI-DETECTOR AGGREGATION

This application claims the benefit of U.S. Provisional Application No. 61/120,143, filed Dec. 5, 2008, the disclosure of which is herein incorporated by reference.

BACKGROUND OF THE INVENTION

The present invention relates to medical imaging of the heart, and more particularly, to automatic detection of the left ventricle in 2D magnetic resonance images.

Cardiovascular disease is the leading cause of death in developed countries. Early diagnosis can be effective in reducing the mortality of cardiovascular disease. Magnetic resonance imaging (MRI) can accurately depict cardiac structure, function, perfusion, and myocardial viability with a capacity unmatched by any other imaging modality. Accordingly, MRI is widely accepted as the gold standard for heart chamber quantification, which means that measurements extracted using other imaging modalities, such as echocardiography and computed tomography (CT), typically must be verified using MRI. Quantification of the left ventricle (LV) is of particular interest among the four heart chambers because it pumps oxygenated blood from the heart to the rest of the body. In order to quantify functional measurements of the LV, it is necessary to detect or segment the LV in an MRI image.

Automatic LV detection in MRI images is a challenging problem due to large variations in orientation, size, shape, and image intensity of the LV. First, unlike CT, MRI is flexible in selecting the orientation of the imaging plane, and this helps cardiologists to capture the best view for diagnosis. However, this flexibility presents a large challenge for automatic LV detection because both the position and orientation of the LV are unconstrained in an image. The LV is a roughly rotation symmetric object around its long axis, which is generally defined as the axis connecting the LV apex to the center of the mitral valve. Long-axis views (where the imaging plane passes through the LV long axis) are often captured to perform LV measurement. However, the orientation of the LV long axis in the image is unconstrained. Second, an MRI image only captures a 2D intersection of a 3D object, therefore information is lost compared to a 3D volume. The image plane can be rotated to get several standard cardiac views, such as the apical-two-chamber (A2C) view, the apical-three-chamber (A3C), the apical-four-chamber (A4C), and the apical-five-chamber (A5C) view. However, this view information is not available to help automatic LV detection. Although the LV and right ventricle (RV) have quite different 3D shapes, in the 2D A4C view, the LV is likely to be confused with the RV. Third, the LV shape changes significantly in a cardiac cycle. The heart is a non-rigid shape, which changes shape as it beats to pump blood to the body. In order to study the dynamics of the heart, a cardiologist needs to capture images from different cardiac phases. The LV shape changes significantly from the end-diastolic (ED) phase (when the LV is the largest) to the end-systolic (ES) phase (when the LV is the smallest). Finally, MRI images captured with different scanners or different imaging protocols have large variations in intensity. Accordingly, an automatic LV detection method which overcomes the above challenges is desirable.

BRIEF SUMMARY OF THE INVENTION

The present invention provides a method and system for automatic left ventricle (LV) detection in 2D MRI images. Embodiments of the present invention separately detect LV candidates, using marginal space learning (MSL), and anatomic landmark candidates related to the LV. A learned ranking model is then used to aggregate features extracted from the LV candidates and anatomic landmark candidates to rank the LV candidates in order to select the best LV candidate.

In one embodiment of the present invention, a plurality of LV candidates are detected, for example using MSL. Apex candidates and base candidates are then detected in the 2D MRI image. The LV candidates are ranked based on geometrical relationships between each LV candidate and the other LV candidates, the apex candidates, and the base candidates using a trained ranking model. The top-ranked LV candidate is selected as a final LV detection result.

These and other advantages of the invention will be apparent to those of ordinary skill in the art by reference to the following detailed description and the accompanying drawings.

BRIEF DESCRIPTION OF THE DRAWINGS

FIG. 4 illustrates a RankBoost algorithm for training a ranking model;

DETAILED DESCRIPTION

The present invention is directed to a method and system for automatic left ventricle (LV) detection in 2D magnetic resonance imaging (MRI) images. Embodiments of the present invention are described herein to give a visual understanding of the left ventricle detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
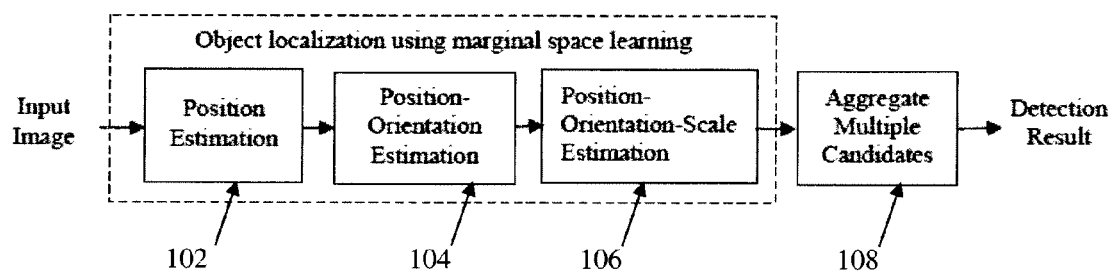
FIG. 1 illustrates object localization using MSL according to an embodiment of the present invention.

Discriminative learning based approaches are efficient and robust for solving many 2D detection problems. In such methods, shape detection and localization is formulated as a classification problem: whether an image block contains the target shape or not. In order to build a robust system, a classifier only tolerates limited variation in object pose. The object is found by scanning the classifier exhaustively over all possible combination of locations, orientations, and scales. This search strategy is different from other parameter estimation approaches, such as deformable models, where an initial estimate is adjusted (e.g., using a gradient descent technique) to optimize a predefined objective function. Exhaustive searching makes the system robust under local minima. However, it is challenging to extend such learning based techniques using exhaustive searching to a high dimensional space because the number of hypotheses increases exponentially with respect to the dimensionality of the parameter space. Recently, marginal space learning (MSL) has been developed to apply learning based techniques for 3D object detection. For example, a method for MSL-based heart chamber segmentation is described in detail in U.S. Patent Application Publication No. 2008/0101676, entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. FIG. 1 illustrates object localization using MSL according to an embodiment of the present invention. As illustrated in FIG. 1, object localization or detection in an input image is split into three steps: object position estimation (step 102), position-orientation estimation (step 104), and position-orientation-scale estimation (step 106). After each step, a few candidates are obtained for the following estimation step. The candidates resulting from the position-orientation-scale estimation step (step 106) are then aggregated at step 108 to generate a detection result. MSL has been successfully applied to many 3D object detection problems in medical imaging.

MSL was originally proposed for 3D object detection. Although MSL can be applied to 2D object detection to detect the LV in a 2D MRI image, this detection problem is challenging due to large variations in orientation, size, shape, and image intensity of the LV. The performance of a single whole-object detector is limited. Accordingly, in addition to the LV whole-object detected using MSL, embodiments of the present invention also detect several LV landmarks, such as the LV apex and two annulus points, and aggregate the detected candidates from the whole-object detector and landmark detectors in order to improve the robustness of the LV detection. Further, embodiments of the present invention utilize a ranking-based method to aggregate information from the detected LV candidates and detected landmark candidates. In this ranking-based method a ranking model is trained to sort the LV whole-body candidates according to the amount of support they get from all of the detectors in order to achieve a more robust LV detection result and reduce the effect of detection outliers.

Figure 2:
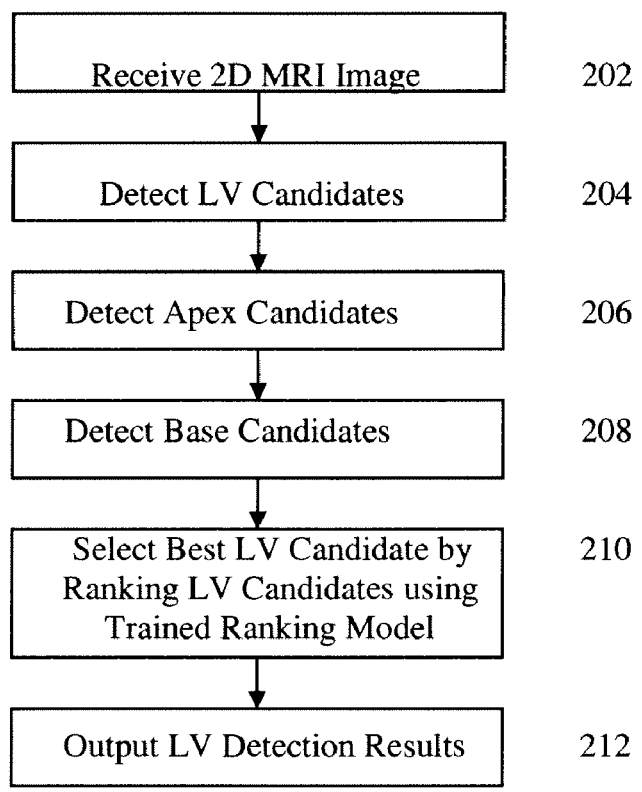
FIG. 2 illustrates a method for LV detection in a 2D MRI image according to an embodiment of the present invention.

FIG. 2 illustrates a method for LV detection in a 2D MRI image according to an embodiment of the present invention. The method of FIG. 1 transforms MRI image data representing a patient's heart to detect or localize the location of the left ventricle in the patient's heart. At step 202, a 2D MRI image is received. The MRI image can be received from an MRI scanning device, or can be a previously stored MRI image loaded from memory or storage of a computer system, or some other computer readable medium.

At step 204, LV candidates are detected in the 2D MRI image using MSL. To localize a 2D object, such as the LV in a 2D MRI image, five parameters must be estimated: two for position, one for orientation, and two for anisotropic scaling. These parameters can be visually represented as a bounding box of the LV, which tightly encloses the LV. The box is aligned with the direction connecting the LV apex and base. The length of the box on this direction is the distance between the apex and the base center (which is defined as the center of two annulus points). The length along the other direction is set to tightly enclose the whole LV. The box center is defined as the center of the LV bounding box. It is close to the center of line connecting the apex and base since the LV has a roughly rotation symmetric shape around its long axis.

In order to detect LV candidates using MSL, a detector is trained for each MSL step (see FIG. 1) based on annotated training data. In the first stage of MSL, the position of the object (LV) is estimated in the image using a trained position detector. For the position estimation, orientation and scales are treated as intra-class variations, therefore learning is constrained in a marginal space with two dimensions. According to an advantageous implementation, the position detector can be trained based on the training data using Haar wavelet features. Given a set of candidate pixels in the training data, the candidates are split into two groups, positive and negative, based on their distance to the ground truth. For example, in an advantageous implementation, a positive sample (X, Y) should satisfy:

$$\max\{|X-X_t|,|Y-Y_t|\}\leq 2 \text{ mm}, \quad (1)$$

and a negative sample should satisfy:

$$\max\{|X-X_t|,|Y-Y_t|\}> 6 \text{ mm}. \quad (2)$$

Here, $(X_t, Y_t)$ is the ground truth of the object (LV) center. The searching step for position estimation can be 1 pixel. All positive samples in the training data satisfying Equation (1) are collected for training. Since the total number of negative samples from a training set is typically very large, a limited number of negatives are used for training. For example, approximately three million negatives can be randomly sampled from the whole training set.

Given a set of positive and negative training samples, 2D Haar wavelet features can be extracted from the training images for the samples. A classifier (detector) is then trained based on these features using a probabilistic boosting tree (PBT). The PBT boosts the performance of weak classifiers to generate a strong tree-structure classifier. The trained position detector is used to scan a training image a preserve a small number of top LV position candidates. The number of preserved candidates can be tuned based on the performance of the trained classifier and the target detection speed of the system. According to an advantageous implementation, 1000 candidates can be preserved in order to ensure that most training images have at least one true positive among the candidates.

After the position detector is trained, the position-orientation detector is then trained. Suppose for a given training image, 1000 candidates, $(X_i, Y_i)$, $i=1, \ldots, 1000$ are preserved for the LV position. A detector is then trained to estimate both the position and orientation. The parameter space for this stage is three dimensional (2D for position and 1D for orientation), so the dimension of the candidates must be augmented. For each position candidate, the orientation space is sampled uniformly to generate hypotheses for position-orientation estimation. The orientation search step can be set to be five degrees, corresponding to 72 hypotheses for the orientation subspace for each position candidate. Among all of these hypotheses some are close to the ground truth (positive) and some are far away (negative). The learning goal is to distinguish the positive and negative samples using image features. In an advantageous implementation, a hypothesis $(X, Y, \theta)$ is regarded as a positive sample if it satisfies both Equation (1) and:

$$|\theta-\theta_t|\leq 5 \text{ degrees}, \quad (3)$$

and a negative sample satisfies either Equation (2) or:

$$|\theta-\theta_t|>10 \text{ degrees}, \quad (4)$$

where $\theta_t$ represents the ground truth of the LV orientation. Similarly to training the position detector, a number of negative samples (e.g., three million) can be randomly sampled over the training set.

Since aligning Haar wavelet features to a specific orientation is not efficient, steerable features can be used for training the position-orientation detector in order to avoid image rotation. A PBT is used to train a classifier (detector) based on the steerable features. The trained position-orientation detector is used to prune the hypotheses to preserve only a few candidates (e.g., 100) for object position and orientation.

Once the position-orientation detector is trained, the position-orientation-scale detector is trained to estimate the full parameter of the LV box. The training of the detector for full parameter estimation is analogous to training the position-orientation detector, except learning is performed in the full five-dimensional similarity transformation space. The dimension of each position-orientation candidate is augmented by scanning the scale subspace uniformly and exhaustively. For example, in an advantageous implementation, the ranges of $S_x$ and $S_y$ of the LV can be [62.9, 186.5] mm and [24.0, 137.8] mm, respectively, and the search step for the scales can be set to 6 mm. In this case, to cover the whole range, 22 uniformly distributed samples are generated for $S_x$ and 20 are generated for $S_y$. In total, there are 440 hypotheses for the scale subspace for each position-orientation candidate.

In an advantageous implementation, a hypothesis $(X, Y, \theta, S_x, S_y)$ is regarded as positive if it satisfies, Equations (1), (3), and:

$$\max\{|S_x - S_x^t|, |S_y - S_y^t|\} \geq 6 \text{ mm}, \quad (5)$$

and a negative sample satisfies any one condition of Equations (2), (4), or:

$$\max\{|S_x - S_x^t|, |S_y - S_y^t|\} > 12 \text{ mm}, \quad (6)$$

where $S_x^t$ and $S_y^t$ represent the ground truth of the LV scales. A number of negative samples (e.g., three million) can be randomly sampled over the training set, and a PBT-based classifier can be trained using steerable features.

In order to detect the LV candidates in the received 2D MRI image in step 204, the image is first normalized. For example, the image can be normalized to a 1 mm resolution. All of the pixels of the normalized image are then tested using the trained position detector in order to detect the pixels with the highest probability of being the center of the LV. A predetermined number of position candidates detected by the position detector with the highest probability are kept. For example, the top 1000 position candidates, $(X_i, Y_i)$, $i = 1, \ldots, 1000$, can be kept. Each position candidate is augmented with a plurality of orientations to generate position-orientation hypotheses. For example, each position candidate can be augmented with 72 orientation hypotheses $(X_i, Y_i, \theta_j)$, $j = 1, \ldots, 72$ to generate $1000 \times 72 = 72,000$ position-orientation hypotheses. The position-orientation hypotheses are tested using the trained position-orientation detector to detect the top position-orientation candidates. For example, the top 100 position-orientation candidates detected by the position-orientation detector can be retained, $(\hat{X}_i, \hat{Y}_i, \hat{\theta}_i)$, $i = 1, \ldots, 100$. Each position-orientation candidate is augmented with a plurality of scales to generate position-orientation-scale hypotheses. For example, each position-orientation candidate can be augmented with 440 scale hypotheses to generate $100 \times 440 = 44,000$ position-orientation-scale hypotheses. The position-orientation-scale hypotheses are then tested using the trained position-orientation-scale detector to detect the top LV box candidates. This results in a predetermined number of LV candidates. For example, the top 100 LV candidates detected by the position-orientation-scale detector with the highest probability can be retained.

Figure 3:
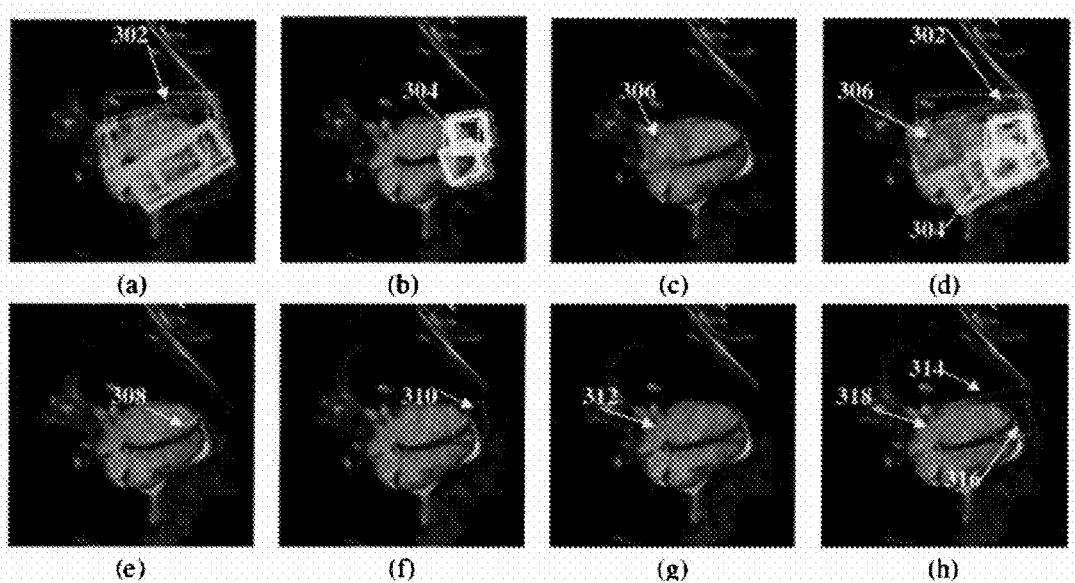
FIG. 3 illustrates LV and anatomical landmark detection results in exemplary 2D MRI images.

FIG. 3 illustrates LV and anatomical landmark detection results in exemplary 2D MRI images. As illustrated in FIG. 3, image (a) shows LV candidates 302 detected using MSL in an A4C canonical view 2D MRI image. The LV and RV are similar in both shape and appearance in this view. Previous MSL applications for 3D object detection aggregate the top candidates resulting from the position-orientation-scale detector using clustering analysis to generate the final detection result. Image (e) of FIG. 3 shows the LV detection result 308 resulting from aggregating the candidates 302 shown in image (a). Since more of the candidates 302 are distributed around the RV, the wrong object is selected as the final aggregated detection result 308. Thus, according to an embodiment of the present invention, the LV candidates resulting from the position-orientation-scale detector are aggregated with other distinctive anatomic landmarks associated with the LV in order achieve more robust LV detection results.

Returning to FIG. 2, at step 206, apex candidates are detected in the received 2D MRI image. For example, similar to the detection of the whole LV candidates described above, MSL can be used to detect candidates for the LV apex, which is a well-known anatomical landmark. Each apex candidate can be visually represented as a box surrounding the LV apex. Although the apex is just a point, it is detected as a region by defining an oriented box around the apex. In this way, the orientation and size information of the surrounding region can be exploited to distinguish the apex from other confusing points. According to an advantageous implementation, the top 100 apex candidates resulting from the apex detection can be retained. Image (b) of FIG. 3 shows apex candidates 304 detected in an exemplary 2D MRI image. Image (f) of FIG. 3 shows the final detection result 310 of the apex generated by aggregating the apex candidates 304 of image (b).

Returning to FIG. 2, at step 208, base candidates are detected in the received 2D MRI image. Each base candidate can be visually represented as a box centered at the basal center (the mitral valve center) and tightly enclosing the annulus points of the mitral valve. The base candidates can be detected using MSL, similar to the detection of the whole LV candidates and the apex candidates described above. According to an advantageous embodiment of the present invention, the top 100 base candidates resulting from the base detection can be retained. In this step (as in the apex detection and the LV detection), selection of the top candidates is based on the detection score. The PBT classifier will assign a high score to a good candidate (closing to the true position) and a low score to a bad candidate (far away from the true position). Image (c) of FIG. 3 shows base candidates 206 detected in an exemplary 2D MRI image. Image (g) shows the final detection result 212 of the base box generated by aggregating the base candidates 206 of image (c).

Returning to FIG. 2, at step 210, the best LV candidate is selected by ranking the LV candidates based on geometric relationships between each LV candidate and the other LV candidates, the apex candidates, and the base candidates using a trained ranking model. Since the trained detectors (LV, apex, and base) tend to detect multiple candidates around the true position, while candidates detected at false positions are sporadic. Accordingly, a correct LV box should have many surrounding detected LV candidates. Furthermore, around the apex of a correct LV box, there should be many detected apex candidates, and around the base of a correct LV box, there should be many detected base candidates. Based on the geometric relationships between LV candidates, apex candidates, and base candidates in training data, a ranking model is trained and used to select the best LV box among the LV candidates.

All ranking features are based on the geometric relationship between a particular LV candidate box and the other candidate boxes. Given boxes $A(X^A, Y^A, \theta^A, S_x^A, S_y^A)$ and $B(X^B, Y^B, \theta^B, S_x^B, S_y^B)$, the following four geometric relationships can be calculated: 1) The center to center distance, which is defined as $D_C(A, B) = \sqrt{(X^A-X^B)^2+(Y^A-Y^B)^2}$; 2) The orientation distance, which is defined as $D_O(A, B) = \|\theta^A - \theta^B\|$; 3) The overlapping ratio, which is defined as the intersection area of A and B divided by their union area, $O(A, B) = (A \cap B)/(A \cup B)$; and 4) The vertex distance, $D_V(A, B)$. Each box has four vertices $V_1, V_2, V_3, V_4$, and these vertices can be consistently assigned with an order based on the box orientation. The vertex-vertex distance is defines as the mean Euclidean distance between the corresponding vertices:

$$D_V(A, B) = \frac{1}{4}\sum_{i=1}^{4} \|V_i^A - V_i^B\|. \tag{7}$$

Among all of the above described features, the center-center and orientation distances only partially measure the difference between two boxes. The overlapping ration has ambiguity with respect to the orientation. For example, rotating box A around its center by 180 degrees does not change the overlapping ratio to any other boxes. The vertex-vertex distance is a most comprehensive distance measure, as $D_V(A, B)=0$ if and only if boxes A and B are the same.

Given an LV candidate box A, three groups of features are extracted and used to learn the ranking model. The first group of features are extracted from the other LV candidate boxes. First all other LV candidate boxes are sorted using the vertex-vertex distance to box A. Therefore, a consistent ordering can be assigned to the extracted feature set, across different boxes. Supposing that box B is another LV candidate box, five features can be extracted from box B, including the detected score (assigned by the LV detector) and the above described four geometric features between boxes A and B. For the example in which 100 LV candidate boxes are detected, a total of 99×5=495 features are selected in this group of features for each LV candidate box.

The second group of features is based on the geometric relationship of the LV candidate box A to all of the detected apex candidates. From box A, the position of its apex, $C_p^A$, can be predicted. In particular, $C_p^A$ is assigned as the center of the box edge of the apex side. Given a detected apex candidate box C, the following three features are extracted: 1) the detection score of box C (assigned by the apex detector); 2) distance to the predicted apex position of the LV candidate box; and 3) orientation distance, $D_O(A, C)$. For the example, in which 100 apex candidates are detected, a total of 100×3=300 features are detected for each LV candidate box based on the geometric relationship between the LV candidate box and the 100 apex candidates.

The third group of features is based on the geometric relationship of the LV candidate box A to all of the detected base candidates. From box A, the position of its base can be predicted. Given a detected base candidate box D, the following three features are extracted: 1) the detection score of box D (assigned by the base detector); 2) distance to the predicted base position of the LV candidate box; and 3) orientation distance, $D_O(A, D)$. For the example in which 100 base candidates are detected, a total of 100×3=300 features are detected for each LV candidate box based on the geometric relationship between the LV candidate box and the 100 base candidates. Including the score of detection score of the LV candidate box A itself and the three groups of features detected for each LV candidate, a total of 1+495+300+300=1096 features can be extracted to train the ranking model.

In order to train the ranking model based on the extracted features, the RankBoost learning algorithm can be used to train (learn) a ranking model that selects the best LV candidate from the candidate list. The goal of the RankBoost learning is to minimize the (weighted) number of pairs of boxes that are mis-ordered by the final ranking, relative to the given ground truth in the annotated training data. Suppose the learner is provided with ground truth about the relative ranking of an individual pair of boxes $x_0$ and $x_1$. Suppose that box $x_1$ should be ranked above box $x_0$, otherwise a penalty $D(x_o, x_1)$ is imposed. According to a possible implementation an equally weighted penalty $D(x_o, x_1)$ may be used. It is also possible that the penalty weights $D(x_o, x_1)$ can be normalized to a probability distribution. The learning goal is to search for the final ranking function H that minimizes the ranking loss:

$$rloss_D(H) = \sum_{x0,x1} D(x_o, x_1)\delta[H(x_1) \le H(x_0)]. \tag{8}$$

Here, $\delta[.]$ is 1 if the predicate holds and 0 otherwise.

FIG. 4 illustrates the RankBoost algorithm for training the ranking model. As shown in FIG. 4, $h_t$ is a weak ranking function, which corresponds to each individual feature described above. The final learned ranking model H is an optimal linear combination of best T features:

$$H(x) = \sum_{t=1}^{T} \alpha_t h_t(x), \tag{9}$$

where x is an LV candidate, $h_t$ corresponds to an individual feature, T denotes the number of features used, and $\alpha_t$ is a weight of feature $h_t$. According to a possible implementation, T can be set equal to 25 to rank the LV candidates based on the 25 best features. The optimal weight $\alpha_t$ for each feature $h_t$ can be found numerically using the well-known Newton-Raphson method.

In order to select the best LV candidate of an input 2D MRI image, the above described features are extracted for each detected LV candidate, and the LV candidates are ranked based on the extracted features using the ranking model trained as described above. The ranking model calculates a ranking score for each LV candidate, and the LV candidate with the highest ranking score is selected as the final LV detection result.

Image (d) of FIG. 3 shows the LV candidates 302, apex candidates 304, and base candidates 306 detected for an exemplary 2D MRI image. Image (h) shows the final detection result for the LV 314 generated by ranking the LV candidates 302 based on geometric relationships between the LV candidates 302, the apex candidates 304 and the base candidates 306 using the trained ranking model.

As a byproduct of the component-based detection of the LV, detection results for the apex and the base of the detected LV can be generated as well. For example, after the final LV detection result is determined, the predicted positions of the apex and the base can be determined for the final LV detection result, and the trained apex and base detectors can be run in a constrained area around these predicted regions to generate apex and base detection results that are consistent with the detected LV. Image (h) of FIG. 3 illustrates final detection results for the apex 316 and the base 318.

Returning to FIG. 2, at step 212, the LV detection results are output. In addition to the detected LV, the LV detection results that are output can also include the detected apex and the detected base as well. For example, the LV detection results can be output by displaying the LV detection results on a display of a computer system, or other display device. It is also possible that the LV detection results can be output by storing the detected LV and corresponding anatomic features, for example, on a storage or memory of a computer system or on a computer readable medium. The output LV detection results can also be used for additional processing of the 2D MRI image. For example, the detected LV can be used in a method for LV quantification to measure activity of the LV.

Figure 5:
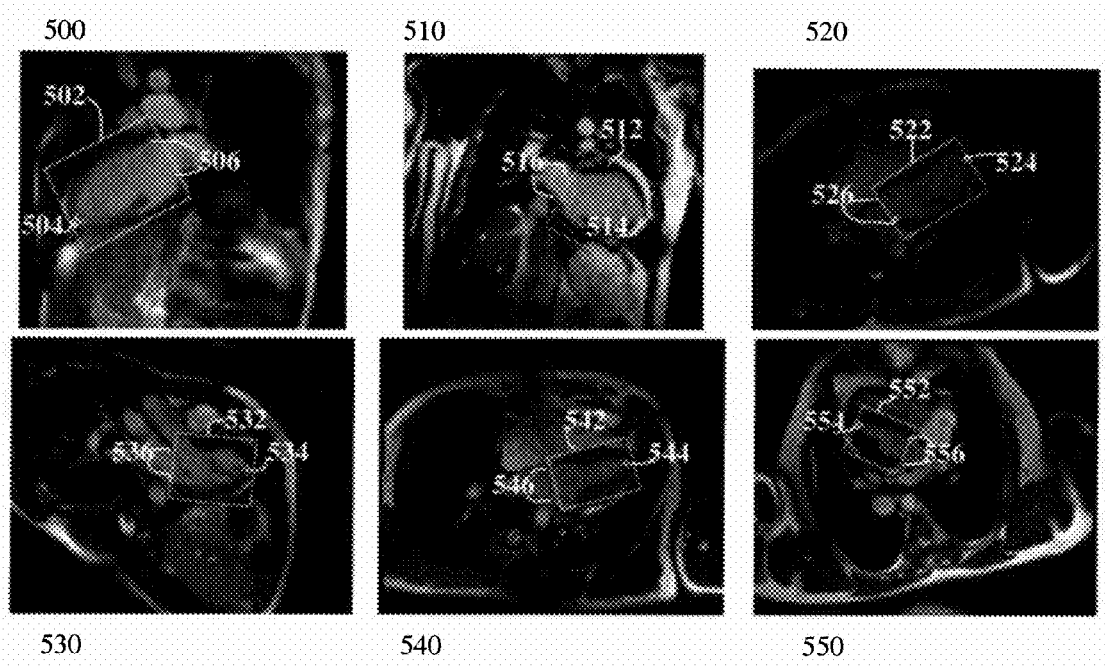
FIG. 5 illustrates exemplary LV detection results.

FIG. 5 illustrates exemplary LV detection results detected using the method of FIG. 2. As illustrated in FIG. 5 each of images 500, 510, 520, 530, 540, and 550 shows a detected LV 502, 512, 522, 532, 542, and 552, a detected apex 504, 514, 524, 534, 544, and 554, and detected mitral valve annulus points 506, 516, 526, 536, 546, 556, respectively. The mitral valve annulus points 506, 516, 526, 536, 546, 556 are anatomic landmarks that are generated from the detected base box. It is straightforward to determine the annulus points from a base box since the box is defined in the following way. The center of the box is defined as the center of two annulus points. The box is aligned with the direction connecting two annulus points. The length of box in the direction connection the two annulus points is the distance between the annulus points. Therefore, each annulus point lies at the center of one of the box's sides.

Figure 6:
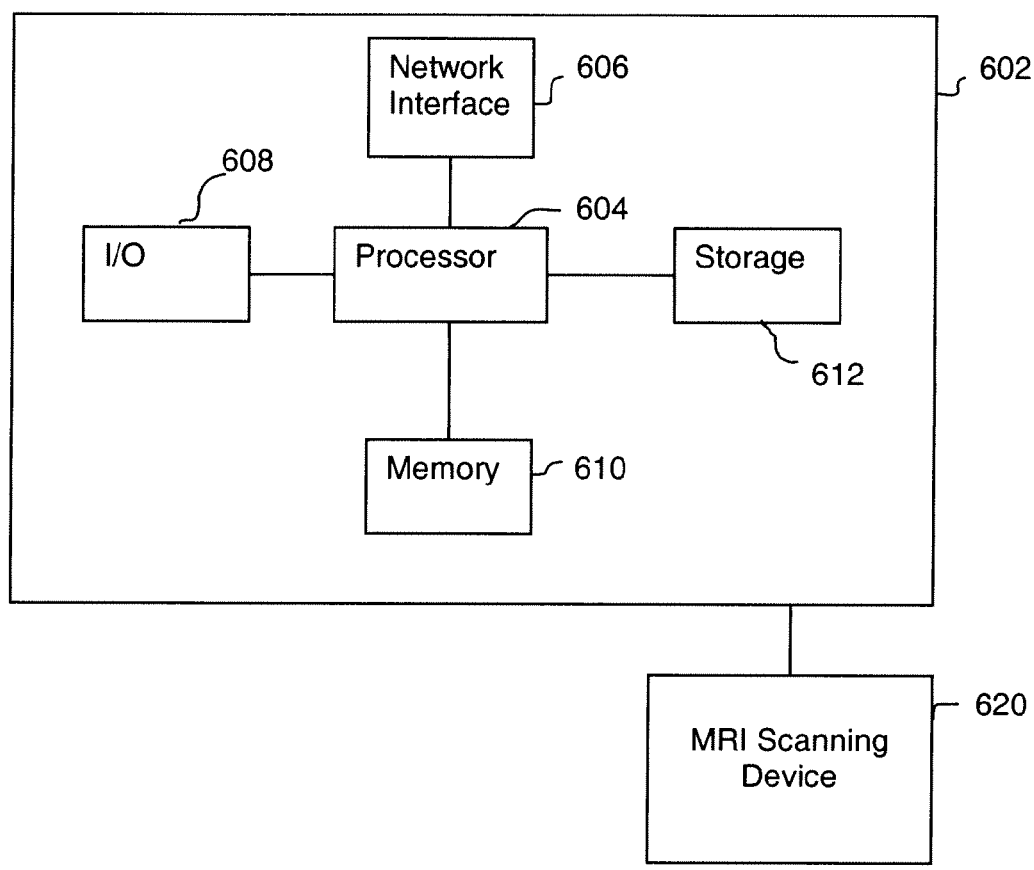
FIG. 6 is a high level block diagram of a computer capable of implementing the present invention.

The above-described methods for LV detection in an input 2D MRI image may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium (e.g., magnetic disk, CD ROM, etc.) and loaded into memory 610 when execution of the computer program instructions is desired. Thus, the steps of the method of FIGS. 2 and 4 may be defined by the computer program instructions stored in the memory 610 and/or storage 612 and controlled by the processor 604 executing the computer program instructions. An MR scanning device 620 can be connected to the computer 602 to input MRI images to the computer 602. It is possible to implement the MR scanning device 620 and the computer 602 as one device. It is also possible that the MR scanning device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for left ventricle (LV) detection in a 2D magnetic resonance imaging (MRI) image, comprising:
   detecting a plurality of LV candidates in the 2D MRI image;
   detecting a plurality of apex candidates in the 2D MRI image;
   detecting a plurality of base candidates in the 2D MRI image; and
   selecting one of the plurality LV candidates by ranking the plurality of LV candidates based on geometrical relationships between each detected LV candidate and the other detected LV candidates, between each detected LV candidate and the detected apex candidates, and between each detected LV candidate and the detected base candidates using a trained ranking model.

2. The method of claim 1, wherein said step of detecting a plurality of LV candidates in the 2D MRI image comprises:
   detecting the plurality of LV candidates using marginal space learning (MSL).

3. The method of claim 1, wherein said step of detecting a plurality of LV candidates in the 2D MRI image comprises:
   detecting a plurality of position candidates for the LV in the 2D MRI image using a trained position detector;
   generating a plurality of position-orientation hypotheses from each of the plurality of position candidates;
   detecting a plurality of position-orientation candidates from the plurality of position-orientation hypotheses using a trained position-orientation detector;
   generating a plurality of position-orientation-scale hypotheses from each of the plurality of position-orientation candidates; and
   detecting the plurality of LV candidates from the plurality of position-orientation-scale hypotheses using a trained position-orientation-scale detector.

4. The method of claim 3, wherein each of the position detector, the position-orientation detector, and the position-orientation-scale detector are trained using a probabilistic boosting tree (PBT).

5. The method of claim 2, wherein the plurality of apex candidates and the plurality of base candidates are detected using MSL.

6. The method of claim 1, wherein said step of selecting one of the plurality LV candidates by ranking the plurality of LV candidates based on geometrical relationships between each detected LV candidate and the other detected LV candidates, between each detected LV candidate and the detected apex candidates, and between each detected LV candidate and the detected base candidates using a trained ranking model comprises:
   extracting a plurality of features for each detected LV candidate, said features including a first group of features based on geometrical relationships between each detected LV candidate and the other detected LV candidates, a second group of features based on geometrical relationships between each detected LV candidate and the detected apex candidates, and a third group of features based on geometrical relationships between each detected LV candidate and the detected base candidates; and
   ranking the plurality of LV candidates based on the extracted features using the trained ranking model.

7. The method of claim 6, wherein the first group of features includes a detection score for each of the detected LV candidates, a center-center distance between each detected LV candidate and each of the other detected LV candidates, an orientation distance between each detected LV candidate and each of the other detected LV candidates, an overlapping area between each detected LV candidate and each of the other detected LV candidates, and a vertex-vertex distance between each detected LV candidate and each of the other detected LV candidates.

8. The method of claim 6, wherein the second group of features includes a detection score for each of the detected apex candidates, a distance between a predicted position of an apex in each of the detected LV candidates and each of the detected apex candidates, and an orientation distance between each of the detected LV candidates and each of the detected apex candidates.

9. The method of claim 6, wherein the third group of features includes a detection score for each of the detected base candidates, a distance between a predicted position of a base in each of the detected LV candidates and each of the detected base candidates, and an orientation distance between each of the detected LV candidates and each of the detected base candidates.

10. The method of claim 1, wherein the trained ranking model is trained based on geometrical relationships between LV candidates, apex candidates, and base candidates detected in annotated training data.

11. The method of 1, further comprising:
determining predicted apex and base positions in the 2D MRI image based on the selected one of the plurality of LV candidates;
detecting the apex of the LV around the predicted apex position in the 2D MRI image; and
detecting the base of the LV around the predicted base position in the 2D MRI image.

12. An apparatus for left ventricle (LV) detection in a 2D magnetic resonance imaging (MRI) image, comprising:
means for detecting a plurality of LV candidates in the 2D MRI image;
means for detecting a plurality of apex candidates in the 2D MRI image;
means for detecting a plurality of base candidates in the 2D MRI image; and
means for selecting one of the plurality LV candidates by ranking the plurality of LV candidates based on geometrical relationships between each detected LV candidate and the other detected LV candidates, between each detected LV candidate and the detected apex candidates, and between each detected LV candidate and the detected base candidates using a trained ranking model.

13. The apparatus of claim 12, wherein said means for detecting a plurality of LV candidates in the 2D MRI image comprises:
means for detecting a plurality of position candidates for the LV in the 2D MRI image using a trained position detector;
means for generating a plurality of position-orientation hypotheses from each of the plurality of position candidates;
means for detecting a plurality of position-orientation candidates from the plurality of position-orientation hypotheses using a trained position-orientation detector;
means for generating a plurality of position-orientation-scale hypotheses from each of the plurality of position-orientation candidates; and
means for detecting the plurality of LV candidates from the plurality of position-orientation-scale hypotheses using a trained position-orientation-scale detector.

14. The apparatus of claim 12, wherein the plurality of LV candidates, the plurality of apex candidates, and the plurality of base candidates are detected using MSL.

15. The apparatus of claim 12, wherein said means for selecting one of the plurality LV candidates by ranking the plurality of LV candidates based on geometrical relationships between each detected LV candidate and the other detected LV candidates, between each detected LV candidate and the detected apex candidates, and between each detected LV candidate and the detected base candidates using a trained ranking model comprises:
means for extracting a plurality of features for each detected LV candidate, said features including a first group of features based on geometrical relationships between each detected LV candidate and the other detected LV candidates, a second group of features based on geometrical relationships between each detected LV candidate and the detected apex candidates, and a third group of features based on geometrical relationships between each detected LV candidate and the detected base candidates; and
means for ranking the plurality of LV candidates based on the extracted features using the trained ranking model.

16. The apparatus of claim 12, wherein the trained ranking model is trained based on geometrical relationships between LV candidates, apex candidates, and base candidates detected in annotated training data.

17. A non-transitory computer readable medium encoded with computer executable instructions for left ventricle (LV) detection in a 2D magnetic resonance imaging (MRI) image, the computer executable instructions defining steps comprising:
detecting a plurality of LV candidates in the 2D MRI image;
detecting a plurality of apex candidates in the 2D MRI image;
detecting a plurality of base candidates in the 2D MRI image; and
selecting one of the plurality LV candidates by ranking the plurality of LV candidates based on geometrical relationships between each detected LV candidate and the other detected LV candidates, between each detected LV candidate and the detected apex candidates, and between each detected LV candidate and the detected base candidates using a trained ranking model.

18. The non-transitory computer readable medium of claim 17, wherein the computer executable instructions defining the step of detecting a plurality of LV candidates in the 2D MRI image comprise computer executable instructions defining the steps of:
detecting a plurality of position candidates for the LV in the 2D MRI image using a trained position detector;
generating a plurality of position-orientation hypotheses from each of the plurality of position candidates;
detecting a plurality of position-orientation candidates from the plurality of position-orientation hypotheses using a trained position-orientation detector;
generating a plurality of position-orientation-scale hypotheses from each of the plurality of position-orientation candidates; and
detecting the plurality of LV candidates from the plurality of position-orientation-scale hypotheses using a trained position-orientation-scale detector.

19. The non-transitory computer readable medium of claim 17, wherein the plurality of LV candidates, the plurality of apex candidates, and the plurality of base candidates are detected using MSL.

20. The non-transitory computer readable medium of claim 18, wherein the computer executable instructions defining the step of selecting one of the plurality LV candidates by ranking the plurality of LV candidates based on geometrical relationships between each detected LV candidate and the other detected LV candidates, between each detected LV candidate and the detected apex candidates, and between each detected LV candidate and the detected base candidates using a trained ranking model comprise computer executable instructions defining the steps of:

extracting a plurality of features for each detected LV candidate, said features including a first group of features based on geometrical relationships between each detected LV candidate and the other detected LV candidates, a second group of features based on geometrical relationships between each detected LV candidate and the detected apex candidates, and a third group of features based on geometrical relationships between each detected LV candidate and the detected base candidates; and ranking the plurality of LV candidates based on the extracted features using the trained ranking model.

21. The non-transitory computer readable medium of claim 20, wherein the first group of features includes a detection score for each of the detected LV candidates, a center-center distance between each detected LV candidate and each of the other detected LV candidates, an orientation distance between each detected LV candidate and each of the other detected LV candidates, an overlapping area between each detected LV candidate and each of the other detected LV candidates, and a vertex-vertex distance between each detected LV candidate and each of the other detected LV candidates.

22. The non-transitory computer readable medium of claim 20, wherein the second group of features includes a detection score for each of the detected apex candidates, a distance between a predicted position of an apex in each of the detected LV candidates and each of the detected apex candidates, and an orientation distance between each of the detected LV candidates and each of the detected apex candidates.

23. The non-transitory computer readable medium of claim 20, wherein the third group of features includes a detection score for each of the detected base candidates, a distance between a predicted position of a base in each of the detected LV candidates and each of the detected base candidates, and an orientation distance between each of the detected LV candidates and each of the detected base candidates.

24. The non-transitory computer readable medium of claim 20, wherein the trained ranking model is trained based on geometrical relationships between LV candidates, apex candidates, and base candidates detected in annotated training data.

\* \* \* \* \*